US012636898B2

(12) United States Patent
Nishihara et al.

(10) Patent No.: US 12,636,898 B2
(45) Date of Patent: May 26, 2026

(54) IMAGE FORMING CONTROL METHOD AND IMAGE FORMING APPARATUS

(71) Applicant: KYOCERA Document Solutions Inc., Osaka (JP)

(72) Inventors: Masaaki Nishihara, Osaka (JP); Takenori Yamamoto, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 133 days.

(21) Appl. No.: 18/758,513

(22) Filed: Jun. 28, 2024

(65) Prior Publication Data

US 2025/0010638 A1 Jan. 9, 2025

(30) Foreign Application Priority Data

Jul. 7, 2023 (JP) ................................ 2023-111857

(51) Int. Cl.
*B41J 11/00* (2006.01)

(52) U.S. Cl.
CPC ...... *B41J 11/0095* (2013.01); *B41J 11/00242* (2021.01); *B41J 11/003* (2013.01)

(58) Field of Classification Search
CPC . B41J 11/0095; B41J 11/00242; B41J 11/003; B41J 11/0024; B41J 29/393
See application file for complete search history.

(56) References Cited

U.S. PATENT DOCUMENTS

2011/0267396 A1* 11/2011 Yamamoto ........... B41J 13/0045 347/16
2020/0242427 A1* 7/2020 Yamamoto ........... G06K 15/027
2020/0254782 A1* 8/2020 Kawai ...................... B65H 7/14

FOREIGN PATENT DOCUMENTS

JP 2020116885 A 8/2020

* cited by examiner

*Primary Examiner* — Lisa Solomon
(74) *Attorney, Agent, or Firm* — Alleman Hall LLP

(57) ABSTRACT

A processor acquires a pair of first lateral edge positions when a first surface of a target sheet serves as a printing surface. The processor acquires a pair of second lateral edge positions when a second surface of the target sheet serves as a printing surface. The processor acquires matching scale information that specifies a matching scale image from among a plurality of first scale images formed on the first surface of the target sheet whose position matches a position in a width direction of one of a plurality of second scale images formed on the second surface of the target sheet. The processor sets a reference center position according to a ratio of an interval between the pair of second lateral edge positions to an interval between the pair of first lateral edge positions and the matching scale information.

9 Claims, 7 Drawing Sheets

IMAGE FORMING CONTROL METHOD AND IMAGE FORMING APPARATUS

INCORPORATION BY REFERENCE

This application is based upon and claims the benefit of priority from the corresponding Japanese Patent Application No. 2023-111857 filed on Jul. 7, 2023, the entire contents of which are incorporated herein by reference.

BACKGROUND

The present disclosure relates to an image forming control method and an image forming apparatus capable of adjusting the position of a print target image according to a detection result of positions of edges at both ends in a width direction of a sheet being conveyed.

The image forming apparatus may include an edge detection portion that is able to detect the positions of both ends in the width direction of the sheet being conveyed. The edge detection portion is arranged on an upstream side of a printing device in a sheet conveying direction.

An image forming apparatus is known in which the image forming apparatus specifies a sheet center position that is a center position in the width direction of the sheet based on a detection result of the edge detection portion, and adjusts the position of the print target image in the width direction according to the sheet center position.

Furthermore, an image forming apparatus is known in which, in order to correct deviation of the center position of the edge detection portion in the width direction, the image forming apparatus forms test images, including a plurality of scale images, on both sides of the sheet. In this case, the image forming apparatus corrects the deviation of the center position of the edge detection portion according to an overlapping state of the plurality of scale images on both sides of the sheet when the sheet is transparentized.

SUMMARY

The image forming control method according to an aspect of the present disclosure is a method of controlling an image forming apparatus. The image forming apparatus includes a sheet conveying device, a printing device, a drying device, and an edge detection portion. The sheet conveying device conveys a sheet along a conveying path. The printing device forms an image on the sheet by ejecting ink onto the sheet conveyed along the conveying path. The drying device is arranged on a downstream side of the printing device in a sheet conveying direction, and includes a heater that heats the sheet, and dries the ink on the sheet; The edge detection portion is arranged on an upstream side of the printing device in the sheet conveying direction and detects a pair of lateral edge positions that are positions of both ends of the sheet in a width direction crossing the sheet conveying direction. The image forming control method includes a processor, when an operation mode is a first mode, causing the sheet conveying device to execute a process of conveying a target sheet in a state where a first surface of the target sheet serves as a printing surface. The image forming control method further includes the processor acquiring a pair of first lateral edge positions that are detection results of the edge detection portion when the target sheet is conveyed with the first surface of the target sheet serving as a printing surface. The image forming control method further includes the processor causing the printing device to execute a process of forming a first test image on the first surface of the target sheet, the first test image including a plurality of first scale images arranged at a first interval in the width direction with reference to a center position of the pair of first lateral edge positions. The image forming control method further includes the processor causing the sheet conveying device to execute a process of conveying the target sheet with a second surface of the target sheet serving as a printing surface. The image forming control method further includes the processor acquiring a pair of second lateral edge positions that are detection results of the edge detection portion when the target sheet is conveyed with the second surface of the target sheet serving as a printing surface. The image forming control method further includes the processor causing the printing device to execute a process of forming a second test image on the second surface of the target sheet, the second test image including a plurality of second scale images arranged at a second interval in the width direction with reference to a center position of the pair of second lateral edge positions. The image forming control method further includes the processor acquiring matching scale information that specifies one of the plurality of first scale images formed on the target sheet whose position in the width direction matches one of the plurality of second scale images. The image forming control method further includes the processor setting a reference center position according to the matching scale information and a sheet width ratio that is a ratio of an interval between the pair of second lateral edge positions to the interval between the pair of first lateral edge positions. The image forming control method further includes the processor, when the operation mode is a second mode, correcting a position of the print target image in the width direction according to a difference between the center position of the pair of lateral edge positions detected by the edge detection portion and the reference center position, and then causing the printing device to execute a process of forming the print target image on the sheet.

The image forming apparatus according to another aspect of the present disclosure includes the sheet conveying device, the printing device, the drying device, the edge detection portion, and the processor.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
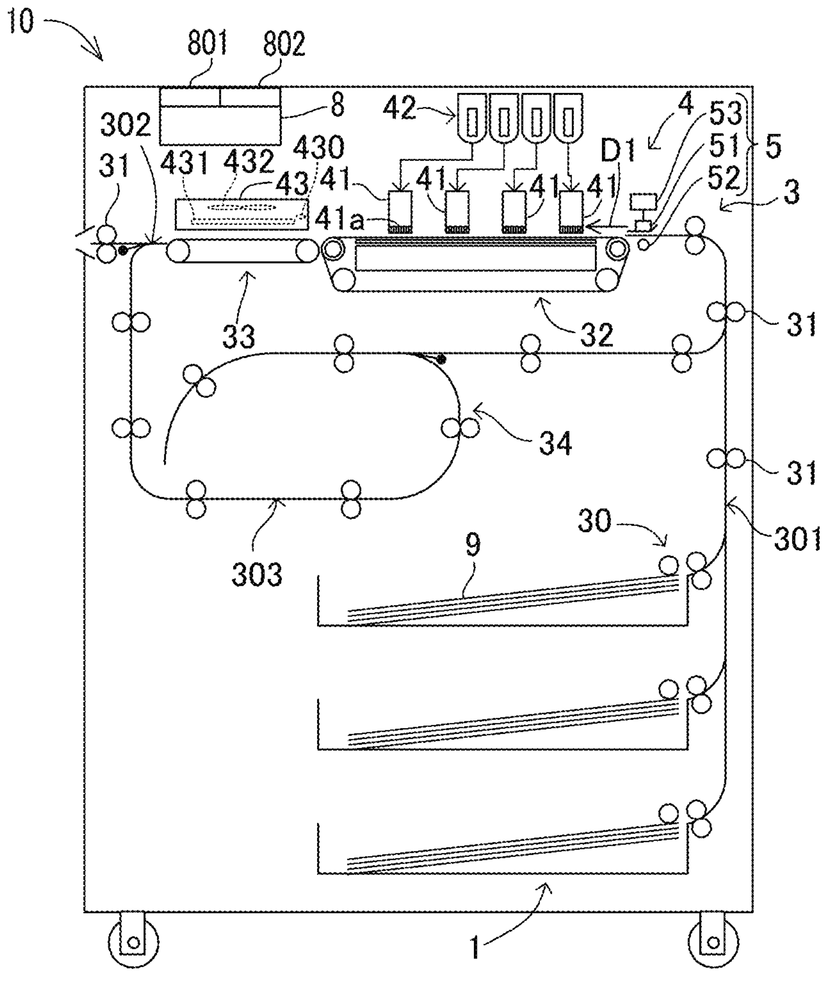
FIG. 1 is a configuration diagram of an image forming apparatus according to an embodiment.

Embodiments according to the present disclosure will be described below with reference to the drawings. Note that the following embodiments are examples of embodying a technique according to the present disclosure, and do not limit the technical scope of the present disclosure.

[Configuration of the Image Forming Apparatus 10]

The image forming apparatus 10 according to an embodiment includes a sheet storing portion 1, a sheet conveying device 3, and a printing device 4.

The sheet conveying device 3 includes a sheet feeding mechanism 30, a plurality of conveying roller pairs 31, a first belt conveying device 32, and a second belt conveying device 33. The sheet feeding mechanism 30 feeds a sheet 9 in the sheet storing portion 1 to a main conveying path 301.

Some of the plurality of conveying roller pairs 31 convey the sheet 9 along the main conveying path 301 and further feeds the sheet 9 to the first belt conveying device 32.

The first belt conveying device 32, taking over from the plurality of conveying roller pairs 31, conveys the sheet 9 and feeds the sheet 9 to the second belt conveying device 33. The second belt conveying device 33, taking over from the first belt conveying device 32, conveys the sheet 9 and further feeds the sheet 9 to a subsequent conveying path 302.

Part of the plurality of the conveying roller pairs 31 convey the sheet 9 along the subsequent conveying path 302, and further feed the sheet 9 to a subsequent portion. For example, the subsequent portion is a discharge tray, a post-processing device, or the like.

In addition, part of the plurality of conveying roller pairs 31 may convey the sheet 9 from the subsequent conveying path 302 to a reverse conveying path 303. The sheet conveying device 3 also includes a reversing mechanism 34 in the reverse conveying path 303 that reverses the sheet 9 and returns the sheet to the main conveying path 301.

Each of the main conveying path 301, the subsequent conveying path 302, and the reverse conveying path 303 is a part of a conveying path of the sheet 9. In addition, belts in each of the first belt conveying device 32 and the second belt conveying device 33 are also part of the conveying path of the sheet 9.

The printing device 4 executes a printing process on the sheet 9 conveyed by the first belt conveying device 32. The printing process is a process of forming an image on the sheet 9.

In the present embodiment, the printing device 4 executes the printing process using an inkjet method. That is, the printing device 4 forms an image on the sheet 9 by ejecting ink onto the sheet 9. The ink is an example of a developing agent.

The printing device 4 includes a plurality of ink heads 41 and a plurality of ink supply portions 42, each corresponding to a different color of ink. More specifically, the printing device 4 includes four ink heads 41 and four ink supply portions 42 corresponding to yellow, magenta, cyan, and black.

Each of the plurality of ink heads 41 has a plurality of ejection nozzles 41*a* that eject ink. The plurality of ink heads 41 are fixed at positions facing the conveying belt 321 of the first belt conveying device 32. The plurality of ink supply portions 42 each contain ink of a different color, and supply the ink to the plurality of ink heads 41.

The first belt conveying device 32 conveys the sheet 9 on which the image is formed to the second belt conveying device 33.

The printing device 4 forms an image on the first surface of the sheet 9 when the sheet 9 is conveyed for the first time by the first belt conveying device 32. The printing device 4 forms an image on the second surface of the sheet 9 when the sheet 9 that has passed through the reverse conveying path 303 is conveyed for the second time by the first belt conveying device 32.

In FIGS. 1, 3 to 5, a conveying direction D1 is the sheet conveying direction. The sheet conveying direction is a direction in which the sheet 9 is conveyed by the sheet conveying device 3. A width direction D2 is a direction crossing the conveying direction D1. The width direction D2 is a main scanning direction in the printing process, and the conveying direction D1 is a sub-scanning direction in the printing process.

The printing device 4 further includes a drying device 43 having a heater 431 that heats the sheet 9. The drying device 43 is arranged on a downstream side of the printing device 4 in the conveying direction D1.

The drying device 43 has the heater 431 that heats the sheet 9. The drying device 43 dries the ink on the sheet 9 conveyed by the second belt conveying device 33.

The drying device 43 further includes a fan 432. The fan 432 sends air heated by the heater 431 to the sheet 9 on the second belt conveying device 33. Furthermore, the drying device 43 includes a temperature sensor 430 that detects a temperature inside the drying device 43.

The image forming apparatus 10 further includes an operation device 801, a display device 802, and a control device 8 (see FIG. 1).

The operation device 801 detects a human operation. For example, the operation device 801 includes a plurality of operation buttons and a touch panel. The display device 802 can display various types of information. For example, the display device 802 is a panel display device such as a liquid crystal display panel.

Figure 2:
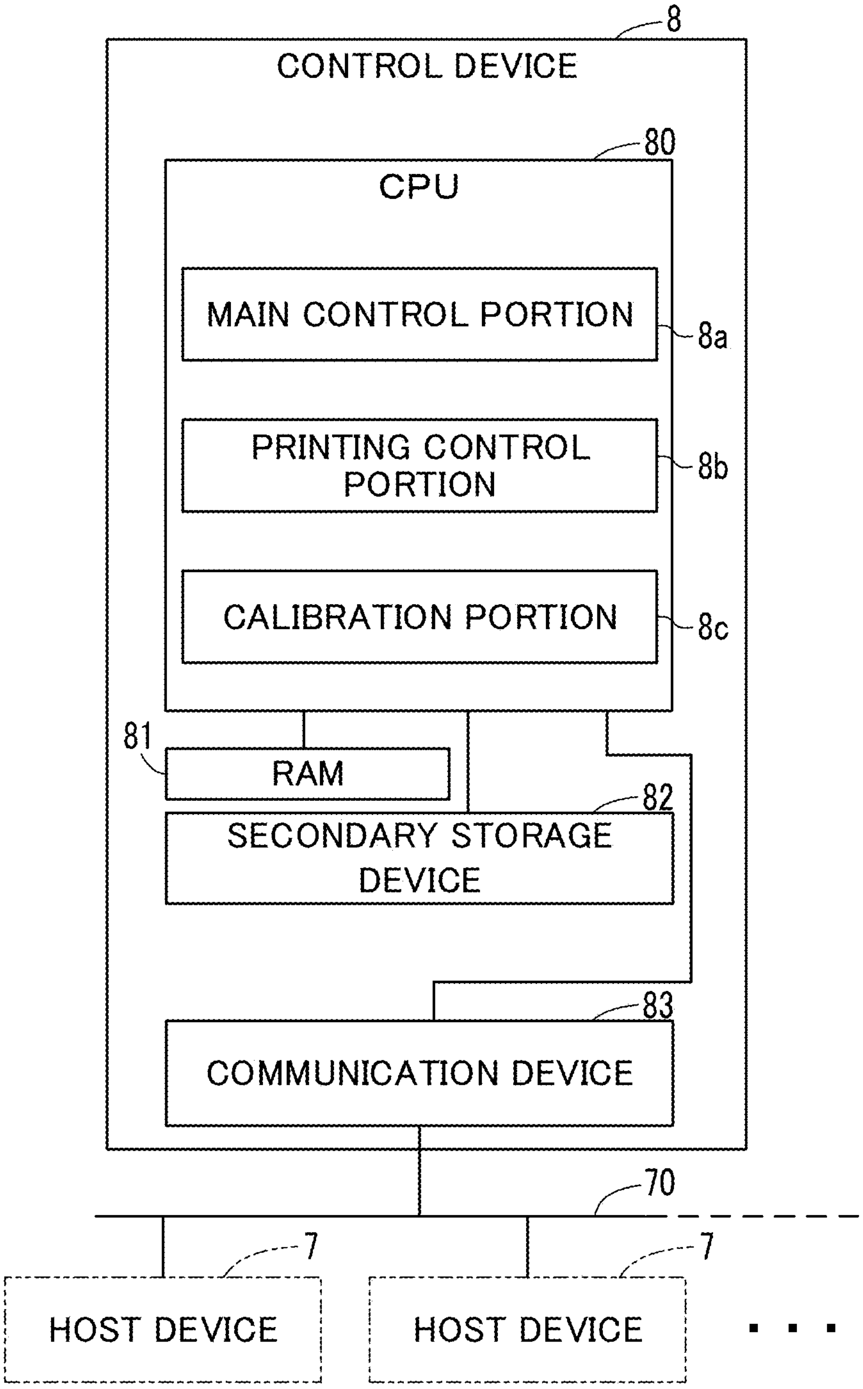
FIG. 2 is a block diagram showing a configuration of a control device in an image forming apparatus according to an embodiment.

As shown in FIG. 2, the control device 8 includes a central processing unit (CPU) 80, a random access memory (RAM) 81, a secondary storage device 82, a communication device 83, and the like.

The CPU 80 performs various types of controls and data processing by executing a computer program. The RAM 81 temporarily stores the computer program executed by the CPU 80 and various types of data.

The secondary storage device 82 is a computer-readable nonvolatile storage device. The secondary storage device 82 stores the computer program executed by the CPU 80 and various types of data. For example, one or both of a flash memory or a hard disk drive may be employed as the secondary storage device 82.

The communication device 83 executes communication with other devices such as a host device 7 via a network 70. The CPU 80 executes communication with other devices via the communication device 83. The host device 7 is an information processing apparatus that requests the image forming apparatus 10 to perform a printing process.

The CPU 80 includes a plurality of processing modules achieved by executing the computer program. The plurality of processing modules include a main control portion 8*a*, a printing control portion 8*b*, and the like (see FIG. 2).

The main control portion 8*a* executes a start control or the like to start various types of processes in response to an operation on the operation device 801 or a processing request received via the communication device 83.

The printing control portion 8*b* controls the sheet conveying device 3 and the printing device 4. The printing control portion 8*b* controls the conveying of the sheet 9 by controlling the sheet conveying device 3.

In addition, the printing control portion 8*b* causes the printing device 4 to execute the printing process in synchronization with the conveying of the sheet 9. Further, the printing control portion 8*b* executes control to supply electric power to the heater 431 of the drying device 43 and control to operate the fan 432 when the printing process for the print target image is executed.

Figure 3:
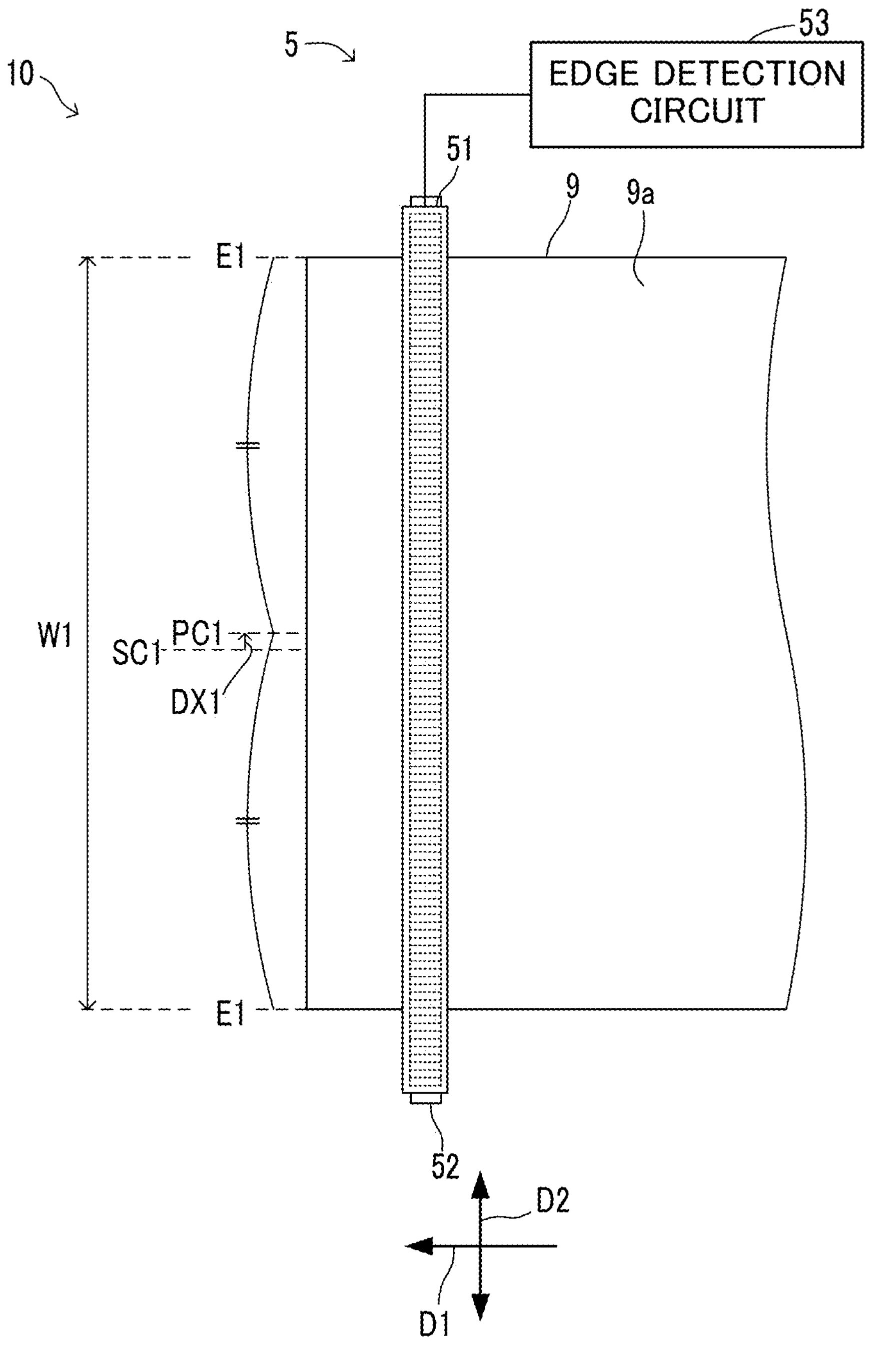
FIG. 3 is a plan view of an edge sensor in an image forming apparatus according to an embodiment.

The image forming apparatus 10 further includes an edge detection device 5 (see FIGS. 1 and 3). The edge detection device 5 is arranged on an upstream side of the printing device 4 in the conveying direction D1.

The edge detection device 5 detects a pair of lateral edge positions E1, which are positions of both ends in the width direction D2 of the sheet 9 conveyed by the sheet conveying device 3 (see FIG. 3). The edge detection device 5 is an example of an edge detection portion.

In this embodiment, the edge detection device 5 includes a line sensor 51, a line light source 52, and an edge detection circuit 53 (see FIGS. 1 and 3).

The line sensor 51 and the line light source 52 are each arranged along the width direction D2 (see FIG. 3). The line sensor 51 and the line light source 52 are arranged to face each other via the main conveying path 301 (see FIG. 1).

The line sensor 51 has a plurality of photoelectric conversion elements arranged along the width direction D2. The line sensor 51 outputs line data including a plurality of pixel data corresponding to a plurality of positions in the width direction D2. The plurality of pixel data indicates the amount of light received by the plurality of photoelectric conversion elements.

The sheet 9 blocks light directed from the line light source 52 to the line sensor 51 while passing through a detection area between the line sensor 51 and the line light source 52.

The edge detection circuit 53 is a device that achieves processing of the line data using hardware. For example, the edge detection circuit 53 is configured by an application specific integrated circuit (ASIC), a digital signal processor (DSP), or the like.

A portion of the line sensor 51 corresponding to the width of the sheet 9 receives a smaller amount of light than other portions. The edge detection circuit 53 detects the pair of lateral edge positions E1 by performing an edge detection process on the line data.

Note that the edge detection device 5 described above is a transmission type photodetection device. On the other hand, a reflective photodetection device may be employed as the edge detection device 5.

In the reflective photodetection device, the line sensor 51 and the line light source 52 are arranged side by side on one side of the detection area. The reflective photodetection device further includes a black reference member arranged facing the line sensor 51 via the detection area.

In the reflective photodetection device, a portion of the line sensor 51 corresponding to the width of the sheet 9 receives a larger amount of light than other portions. Also in the reflective photodetection device, the edge detection circuit 53 detects the pair of lateral edge positions E1 by performing an edge detection process on the line data.

In the image forming apparatus 10, a center position in the width direction D2 in the detection area is set as a reference center position SC1 (see FIG. 3). The reference center position SC1 is a position corresponding to a specific piece of data of the plurality of pixel data of the line data.

The reference center position SC1 is associated with the print center position, which is the center position in the width direction D2 in the print width area. The print width area is an area in the width direction D2 in which the printing device 4 can form an image.

In the following description, the center position of the pair of lateral edge positions E1 will be referred to as a sheet center position PC1 (see FIGS. 4 and 5). The sheet center position PC1 is the center position in the width direction D2 of the sheet 9 passing through the detection area.

A situation in which the sheet center position PC1 matches the reference center position SC1 is a situation in which the sheet 9 is being conveyed at a predetermined position in the width direction D2.

The printing control portion 8*b* executes a width position correction process every time one sheet 9 is conveyed. The width position correction process is a process of correcting the position of the print target image in the width direction D2 according to a position difference DX1 that is the difference between the sheet center position PC1 and the reference center position SC1 (see FIG. 3).

The printing control portion 8*b* executes the width position correction process for each sheet 9, and then causes the printing device 4 to execute the printing process for the print target image whose position in the width direction D2 has been corrected. Thus, the print target image is formed on the sheet 9 at an appropriate position in the width direction D2.

However, in a case where the reference center position SC1 in the edge detection device 5 deviates from the print center position in the printing device 4, the print target image may be formed at a position biased to one side in the width direction D2 on the sheet 9.

The plurality of processing modules of the CPU 80 further include a calibration portion 8*c*. The printing control portion 8*b* and the calibration portion 8*c* execute a center position calibration process, which will be described later (see FIG. 7). The center position calibration process is a process for correcting the deviation of the reference center position SC1 from the print center position.

In the following description, the sheet 9 used for the center position calibration process will be referred to as a target sheet 9*x* (see FIGS. 4 and 5).

Figure 4:
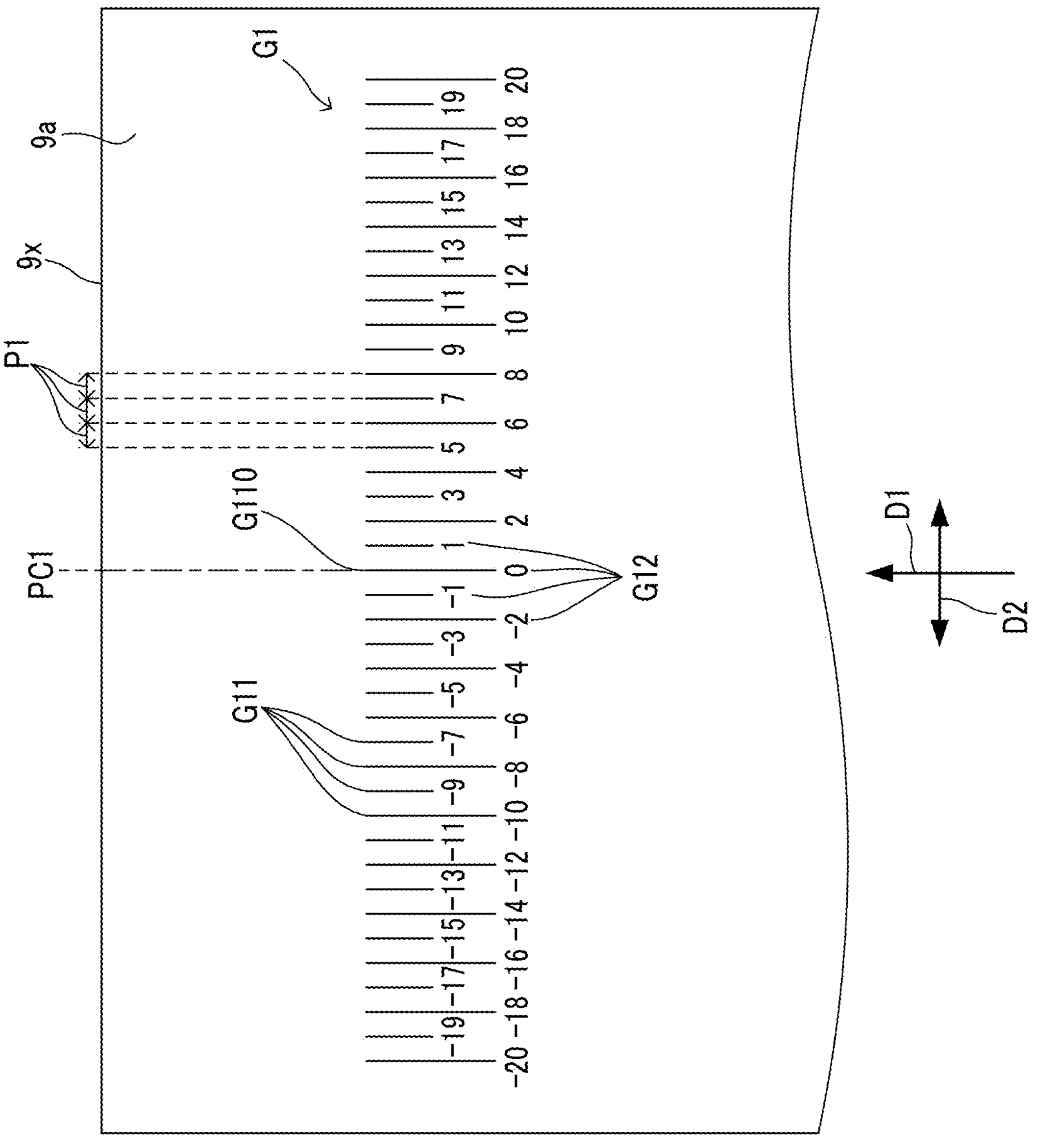
FIG. 4 is a diagram showing an example of a first surface of a target sheet on which a first test image is formed by an image forming apparatus according to an embodiment.
Figure 5:
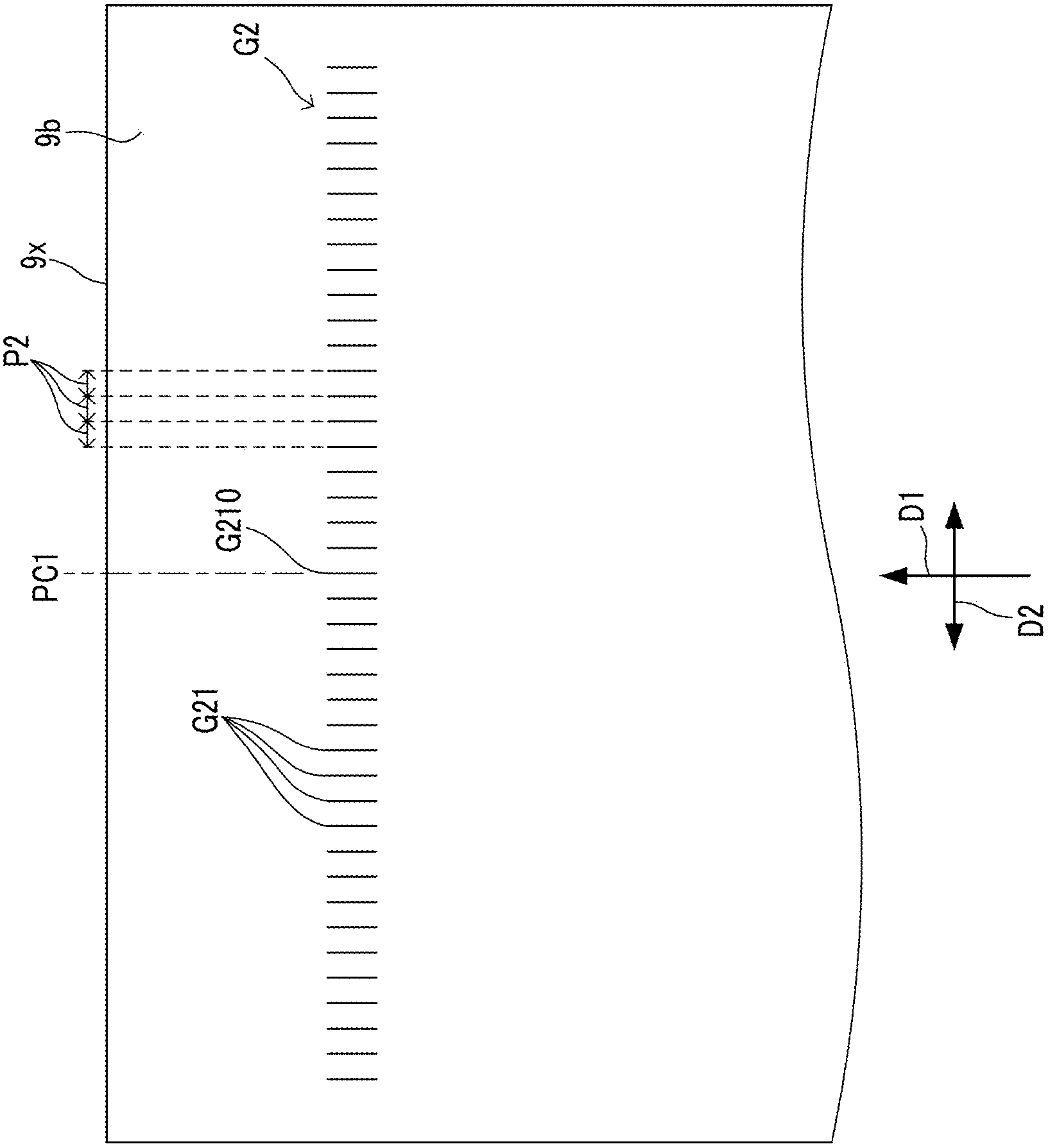
FIG. 5 is a diagram showing an example of a second surface of a target sheet on which a second test image is formed by an image forming apparatus according to an embodiment.

In the center position calibration process, the calibration portion 8*c* causes the printing device 4 to execute a process of forming a first test image G1 on the first surface 9*a* of the target sheet 9*x*, and a process of forming a second test image G2 on the second surface 9*b* of the target sheet 9*x* (see FIGS. 4 and 5).

The first test image G1 includes a plurality of first scale images G11 arranged at a first interval P1 in the width direction D2 (see FIG. 4). Furthermore, the first test image G1 includes a plurality of identification value images G12 corresponding to the plurality of first scale images G11.

The second test image G2 includes a plurality of second scale images G21 arranged at second intervals P2 in the width direction D2 (see FIG. 5). The second interval P2 is one pixel larger than the first interval P1.

The plurality of identification value images G12 are images each representing a value for identifying the plurality of first scale images G11.

As will be described later, the calibration portion 8*c* corrects the deviation of the reference center position SC1 according to an overlapping state of the plurality of scale images G11, G21 on both sides of the target sheet 9*x* when the target sheet 9*x* is transparentized.

The image forming apparatus 10 includes the drying device 43 that dries the ink image formed on the sheet 9 by heating it.

In a case where the first test image G1 and the second test image G2 are formed on the target sheet 9*x*, the target sheet 9*x* passes through the drying device 43 after the first test image G1 has been formed on the first surface 9*a* of the target sheet 9*x*. Furthermore, the target sheet 9*x* that has passed through the drying device 43 passes through the position of the edge detection device 5, and the second test image G2 is formed on the second surface 9*b* of the target sheet 9*x*.

In a case where the temperature of the drying device 43 is high, the target sheet 9*x* may shrink as it passes through the drying device 43. Therefore, in a case where the temperature of the drying device 43 is high, the first test image G1 is formed on the first surface 9*a* of the target sheet 9*x* before shrinkage, and the second test image G2 is formed on the second surface 9*b* of the target sheet 9*x* after shrinkage.

The shrinkage of the target sheet 9*x* has an adverse effect on the correction of the deviation of the reference center position SC1 due to the first test image G1 and the second test image G2 that are formed on both surfaces of the target sheet 9*x*.

The center position calibration process in the present embodiment includes a process for preventing shrinkage of the target sheet 9*x* due to passing through the drying device 43 from adversely affecting the correction of the reference center position SC1.

In the present embodiment, the main control portion 8*a* switches the operation mode of the image forming apparatus 10 from the normal mode to the calibration mode when a calibration start operation is detected by the operation device 801. The initial state of the operation mode is the normal mode.

The center position calibration process is executed when the operation mode is the calibration mode. When the center position calibration process is completed, the main control portion 8*a* returns the operation mode from the calibration mode to the normal mode.

When the operation mode is the normal mode, the printing control portion 8*b* executes the width position correction process for each sheet 9, and then causes the printing device 4 to execute the printing process for the print target image whose position in the width direction D2 has been corrected.

The calibration mode is an example of a first mode, and the normal mode is an example of a second mode.

[Center Position Calibration Process]

Figure 7:
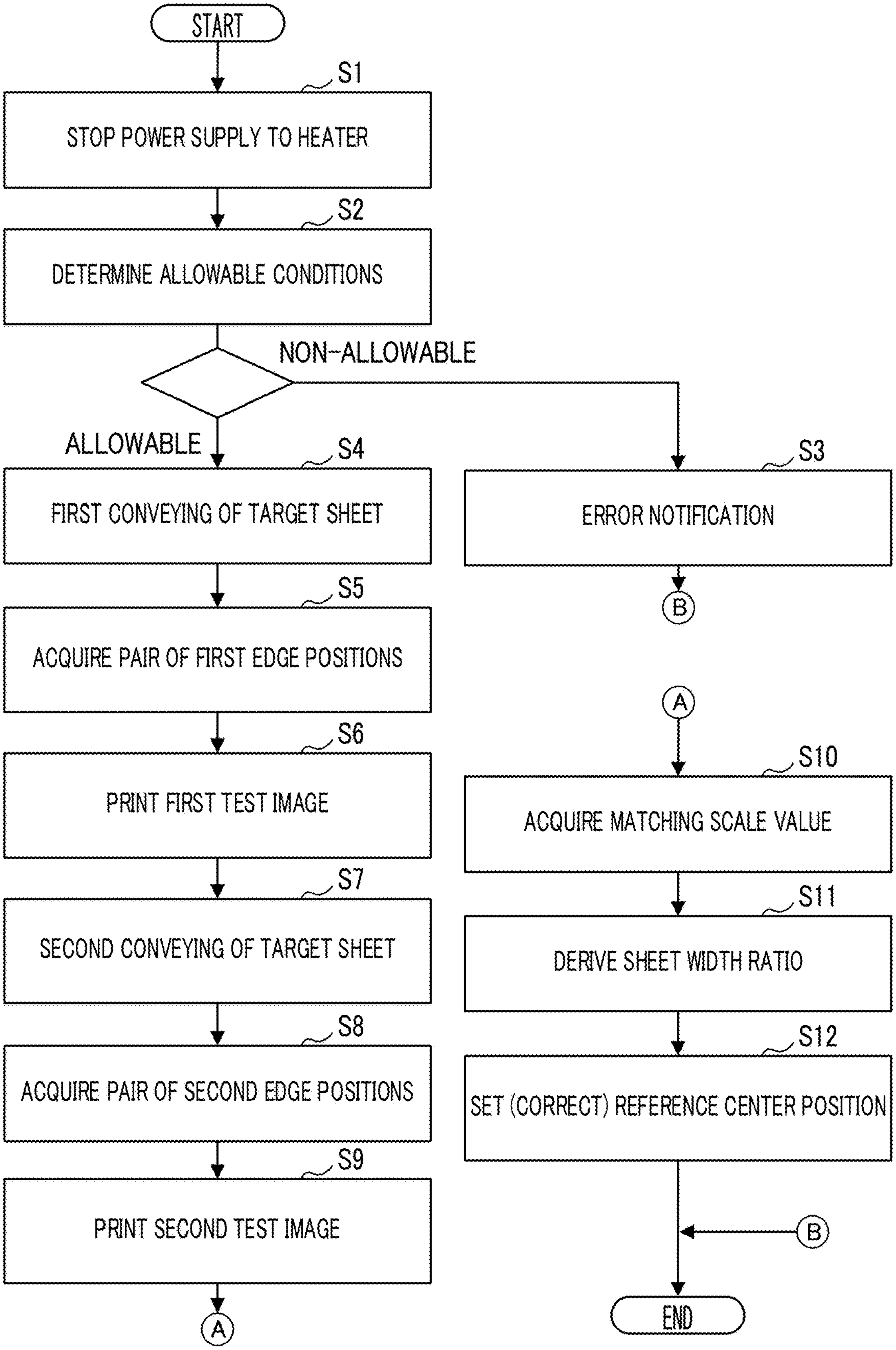
FIG. 7 is a flowchart showing an example of a procedure of a center position calibration process in an image forming apparatus according to an embodiment.

In the following, an example of a procedure of the center position calibration process will be described with reference to the flowchart shown in FIG. 7.

The center position calibration process is an example of a process that achieves the image forming control method for controlling the image forming apparatus 10. The CPU 80 is an example of a processor that achieves the image forming control method.

In the following description, S1, S2, and so on represent identification codes of a plurality of steps in the center position calibration process. In the center position calibration process, first, the process of step S1 is executed.

<Step S1>

In step S1, the printing control portion 8*b* executes control to stop power supply to the heater 431 of the drying device 43.

After executing the process of step S1, the printing control portion 8*b* moves the process to step S2. The processes from step S2 on are executed while power supply to the heater 431 is stopped.

<Step S2>

In step S2, the calibration portion 8*c* determines whether the image forming apparatus 10 is in an allowable state that satisfies predetermined allowable conditions or is in a non-allowable state that does not satisfy the allowable conditions.

In the present embodiment, the allowable conditions include an allowable temperature condition regarding the temperature of the drying device 43 and an allowable thickness condition regarding the thickness of the target sheet 9*x*.

The allowable temperature condition is a condition in which the temperature detected by the temperature sensor 430 of the drying device 43 does not exceed a preset allowable temperature. In step S2, the calibration portion 8*c* acquires the temperature detected by the temperature sensor 430, and further determines whether or not the detected temperature satisfies the allowable temperature condition.

The allowable thickness condition is a condition in which the thickness information representing the thickness of the target sheet 9*x* does not exceed a preset allowable thickness. In step S2, the calibration portion 8*c* acquires the thickness information stored in the secondary storage device 82, and further determines whether or not the thickness information satisfies the allowable thickness condition.

The thickness information is stored in the secondary storage device 82 in a state corresponding to the sheet storing portion 1. The calibration portion 8*c* acquires the thickness information corresponding to the sheet storing portion 1, which is a supply source of the target sheet 9*x*, from the secondary storage device 82.

For example, the thickness information is information representing the basis weight of the target sheet 9*x*, and the allowable thickness is a preset allowable upper limit value of the basis weight of the target sheet 9*x*.

The allowable temperature condition is determined in order to avoid excessive shrinkage of the target sheet 9*x* due to the target sheet 9*x* passing through the drying device 43. The allowable thickness condition is determined in order to avoid a situation in which the second test image G2 cannot be viewed from the first surface 9*a* side of the target sheet 9*x* when the target sheet 9*x* is transparentized.

The calibration portion 8*c* determines that the image forming apparatus 10 is in the allowable state in a case where both the allowable temperature condition and the allowable thickness condition are satisfied. On the other hand, the calibration portion 8*c* determines that the image forming apparatus 10 is in the non-allowable state when at least one of the allowable temperature condition and the allowable thickness condition is not satisfied.

When the calibration portion 8*c* determines that the image forming apparatus 10 is in the non-allowable state, the calibration portion 8*c* moves the process to step S3. On the other hand, when the calibration portion 8*c* determines that the image forming apparatus 10 is in the allowable state, the calibration portion 8*c* moves the process to step S4.

<Step S3>

In step S3, the calibration portion 8*c* executes an error notification to give notification of predetermined error information via the display device 802.

For example, the error information is information indicating that the image forming apparatus 10 does not satisfy the allowable conditions and what the user should do in order for the image forming apparatus 10 to satisfy the allowable conditions.

After executing the process of step S3, the calibration portion 8*c* ends the center position calibration process. Note that the calibration portion 8*c* may repeat the processes of step S2 and step S3 until the image forming apparatus 10 is in a state that satisfies the above-mentioned allowable conditions.

In a case where the temperature detected by the temperature sensor 430 does not satisfy the allowable temperature condition, the printing control portion 8*b* may operate the fan 432 while stopping power supply to the heater 431 of the drying device 43. Thus, cooling of the drying device 43 is promoted.

The processes from step S4 on described below are executed on the condition that both the allowable temperature condition and the allowable thickness condition are satisfied.

<Step S4>

In step S4, the printing control portion 8*b* causes the sheet conveying device 3 to execute a first conveying process of conveying the target sheet 9*x* with the first surface 9*a* of the target sheet 9*x* serving as the printing surface.

While the first conveying process is being executed, the processes of step S5 and step S6 are executed.

<Step S5>

In step S5, the calibration portion 8*c* acquires data regarding the pair of first lateral edge positions from the edge detection device 5 at timing when the target sheet 9*x* passes through the detection area. The pair of first lateral edge positions are the detection results of the edge detection device 5 when the target sheet 9*x* is conveyed with the first surface 9*a* of the target sheet 9*x* serving as the printing surface.

After executing the process of step S5, the calibration portion 8*c* moves the process to step S6.

<Step S6>

In step S6, the printing control portion 8*b* causes the printing device 4 to execute a process of forming the first test image G1 on the first surface 9*a* of the target sheet 9*x*.

In step S6, the printing control portion 8*b* executes the width position correction process on the first test image G1 including a plurality of first scale images G11 arranged at a first interval P1 in the width direction D2 with reference to the preset reference center position SC1.

That is, the printing control portion 8*b* corrects the position in the width direction D2 of the first test image G1 with reference to the reference center position SC1 according to the difference between the center position of the pair of first lateral edge positions obtained in step S5 and the reference center position SC1.

The plurality of first scale images G11 include a first reference scale image G110 (see FIG. 4). The first reference scale image G110 is one of the plurality of first scale images G11 that is located at the center in the width direction D2.

In the first test image G1 before the width position correction process is performed, the first reference scale image G110 is located at the reference center position SC1.

In step S6, the printing control portion 8*b* causes the printing device 4 to execute a process of forming the first test image G1, which has been subjected to the width position correction process, on the first surface 9*a* of the target sheet 9*x*.

In the first test image G1 after the width position correction process, the first reference scale image G110 is located at the sheet center position PC1 corresponding to the pair of first lateral edge positions. The sheet center position PC1 corresponding to the pair of first lateral edge positions is the center position of the pair of first lateral edge positions.

That is, in step S6, the printing control portion 8*b* causes the printing device 4 to execute a process of forming a first test image G1 including the plurality of first scale images G11 arranged at a first interval P1 in the width direction D2 with reference to the center position of the pair of first lateral edge positions.

After executing the process of step S6, the printing control portion 8*b* moves the process to step S7.

<Step S7>

In step S7, the printing control portion 8*b* causes the sheet conveying device 3 to execute a second conveying process of conveying the target sheet 9*x* with the second surface 9*b* of the target sheet 9*x* serving as the printing surface.

In the present embodiment, the sheet conveying device 3 is able to automatically execute the second conveying process following the first conveying process by reversing and conveying the target sheet 9*x* on which the first test image G1 is formed.

In a case where the sheet conveying device 3 does not include a reverse conveying mechanism, the main control portion 8*a*, in step S7, sends notification by a 'set target sheet' message via the display device 802. The 'set target sheet' message is a message prompting the user to set the target sheet 9*x* in the sheet storing portion 1 so that the second surface 9*b* of the target sheet 9*x* becomes the printing surface.

When the operation device 801 detects a conveying start operation corresponding to the 'set target sheet' message, the printing control portion 8*b* causes the sheet conveying device 3 to execute the second conveying process for the target sheet 9*x* set in the sheet storing portion 1.

While the second conveying process is being executed, the processes of step S8 and step S9 are executed.

<Step S8>

In step S8, the calibration portion 8*c* acquires data regarding the pair of second lateral edge positions from the edge detection device 5 at timing when the target sheet 9*x* passes through the detection area. The pair of first lateral edge positions are the detection results of the edge detection device 5 when the target sheet 9*x* is conveyed with the second surface 9*b* of the target sheet 9*x* serving as the printing surface.

After executing the process of step S8, the calibration portion 8*c* moves the process to step S9.

<Step S9>

In step S9, the printing control portion 8*b* causes the printing device 4 to execute a process of forming the second test image G2 on the second surface 9*b* of the target sheet 9*x*.

In step S9, the printing control portion 8*b* executes the width position correction process on the second test image G2 including a plurality of second scale images G21 arranged at a second interval P2 in the width direction D2 with reference to the preset reference center position SC1.

That is, the printing control portion 8*b* corrects the position in the width direction D2 of the second test image G2 with reference to the reference center position SC1 according to the difference between the center position of the pair of second lateral edge positions obtained in step S8 and the reference center position SC1.

The plurality of second scale images G21 include a second reference scale image G210 (see FIG. 5). The second reference scale image G210 is one of the plurality of second scale images G21 that is located at the center in the width direction D2.

In the second test image G2 before the width position correction process is performed, the second reference scale image G210 is located at the reference center position SC1.

In step S9, the printing control portion 8*b* causes the printing device 4 to execute a process of forming the second test image G2, which has been subjected to the width position correction process, on the second surface 9*b* of the target sheet 9*x*.

In the second test image G2 after the width position correction process, the second reference scale image G210 is located at the sheet center position PC1 corresponding to the pair of second lateral edge positions. The sheet center position PC1 corresponding to the pair of second lateral edge positions is the center position of the pair of second lateral edge positions.

That is, in step S9, the printing control portion 8*b* causes the printing device 4 to execute a process of forming the second test image G2 including the plurality of second scale images G21 arranged at a second interval P2 in the width direction D2 with reference to the center position of the pair of second lateral edge positions.

After executing the process of step S9, the printing control portion 8*b* moves the process to step S10.

<Step S10>

In step S10, the calibration portion 8*c* executes a process of acquiring a matching scale value.

Figure 6:
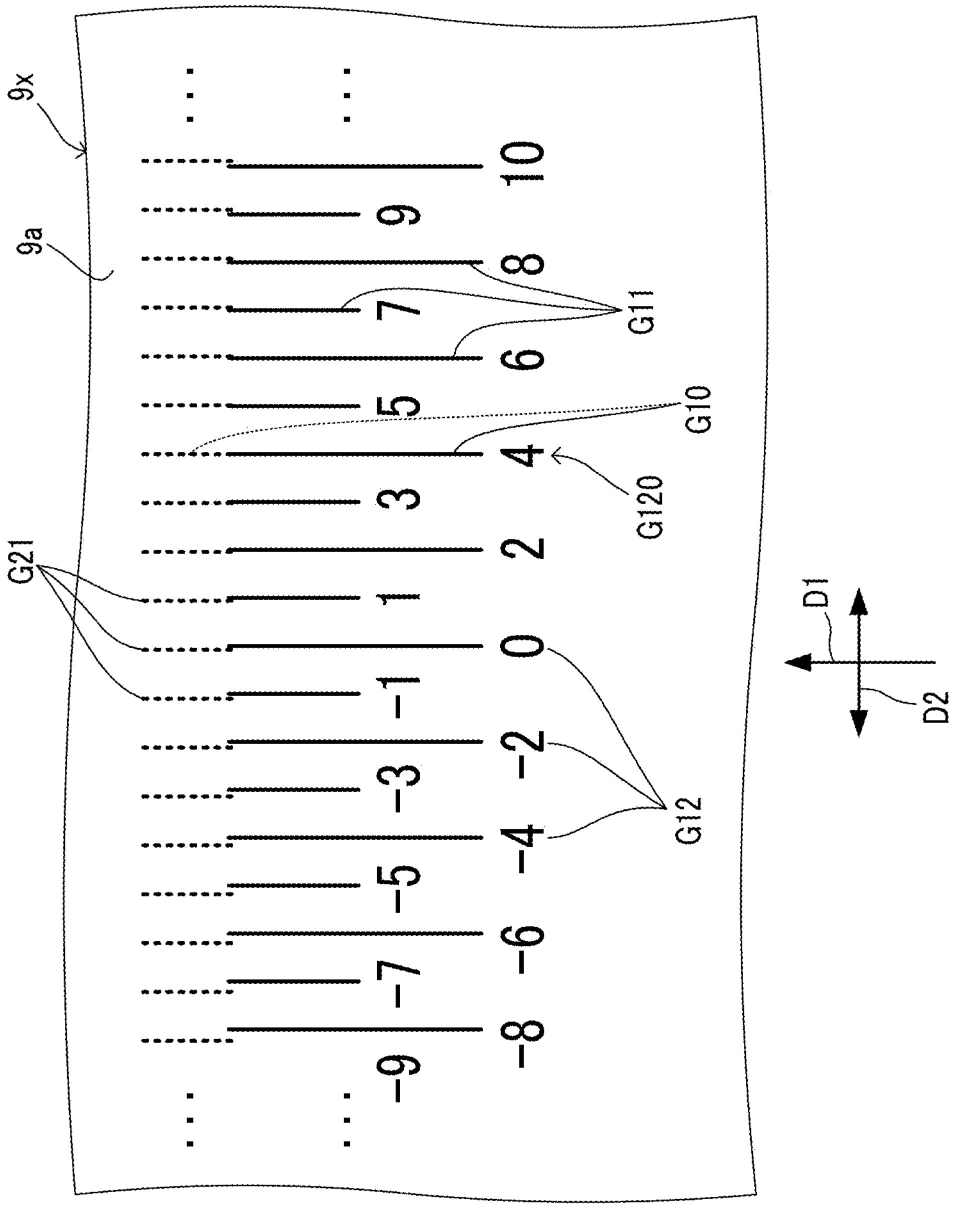
FIG. 6 is an enlarged view of a portion of a first surface of a target sheet on which a first test image is formed.

The matching scale value is a numerical value that specifies a matching scale image G10 from among the plurality of first scale images G11 formed on the target sheet 9*x* whose position in the width direction D2 matches one of the plurality of second scale images G21 (see FIG. 6).

In the present embodiment, the matching scale value is a numerical value represented by a specific identification value image G120 corresponding to the matching scale image G10 among the plurality of identification value images G12. The matching scale value is an example of matching scale information.

As shown in FIG. 4, the plurality of numerical values represented by the plurality of identification value images G12 are numerical values that increase by one from the first side to the second side in the width direction D2. Furthermore, the numerical value corresponding to the first reference scale image G110 is 0.

In the example shown in FIG. 4, 41 first scale images G11 are arranged at first intervals P1 in the width direction D2. Furthermore, the 41 identification value images G12 are associated with the 41 first scale images G11, and are arranged in order from a first side to a second side in the width direction D2.

In the example shown in FIG. 6, the matching scale image G10 is the fourth scale image to the second side based on the first reference scale image G110 among the plurality of first scale images G11. In this case, the matching scale value is 4.

In step S10, the calibration portion 8*c* notifies the user of a predetermined transparentization request message via the display device 802.

The transparentization request message includes a message requesting to identify the matching scale image G10 by visually inspecting the target sheet 9*x* from the first surface 9*a* side.

Furthermore, the transparentization request message includes a message requesting that the numerical value represented by the specific identification value image G120 corresponding to the matching scale image G10 be inputted via the operation device 801.

The calibration portion 8*c* acquires the numerical value input to the operation device 801 in response to the notification of the transparentization request message as the matching scale value.

Note that the plurality of identification value images G12 may be images representing, for example, a plurality of symbols. In this case, the calibration portion 8*c* converts a symbol obtained in step S10 into a numerical value according to a preset conversion table.

After executing the process of step S10, the calibration portion 8*c* moves the process to step S11.

<Step S11>

In step S11, the calibration portion 8*c* derives a first sheet width and a second sheet width, and further derives a sheet width ratio that is a ratio of the second sheet width to the first sheet width.

The first sheet width is the distance between the pair of first lateral edge positions obtained in step S5. The first sheet width is the distance between the pair of second lateral edge positions obtained in step S8.

In a case where the target sheet 9*x* shrinks due to passing through the drying device 43 when the first conveying process is executed, a sheet width ratio that is less than 1 is derived.

After executing the process of step S11, the calibration portion 8*c* moves the process to step S12.

<Step S12>

In step S12, the calibration portion 8*c* corrects the reference center position SC1 according to the sheet width ratio and the matching scale value, and sets the corrected reference center position SC1 as a new reference center position SC1.

More specifically, the calibration portion 8*c* applies X, which is the matching scale value, and R, which is the sheet width ratio R, to the following Equation (1) to calculate Y, which is a corrected number of pixels at the reference center position SC1. Note that P in Equation (1) is the first interval P1.

The reference center position SC1 is represented by a pixel position in the width direction D2. The calibration portion 8*c* sets a position obtained by correcting the original reference center position SC1 by the corrected number of pixels as a new reference center position SC1. The calibration portion 8*c* records information on the corrected reference center position SC1 in the secondary storage device 82.

Note that Equation (1) is an equation that is adopted in a case where the second interval P2 is larger than the first interval P1 by one pixel.

After executing the process of step S12, the calibration portion 8*c* ends the center position calibration process. When the center position calibration process is completed, the main control portion 8*a* returns the operation mode from the calibration mode to the normal mode.

When the operation mode is the normal mode, the printing control portion 8*b* executes the width position correction process for each sheet 9, and then causes the printing device 4 to execute the printing process for the print target image whose position in the width direction D2 has been corrected. In the width position correction process, the corrected reference center position SC1 is used.

By executing the center position calibration process, the reference center position SC1 is corrected to reflect the sheet width ratio (see step S12). The sheet width ratio represents a shrinkage rate of the target sheet 9x due to passing through the drying device 43.

Therefore, by employing the center position calibration process, the shrinkage of the target sheet 9x due to passing through the drying device 43 is prevented from adversely affecting the correction of the reference center position SC1.

By employing the image forming apparatus 10, even in a case where the center position calibration process is executed without waiting until the temperature of the drying device 43 drops to room temperature, an adverse effect of shrinkage of the target sheet 9x on the correction of the reference center position SC1 will be prevented.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image forming control method for controlling an image forming apparatus, the image forming apparatus comprising:

a sheet conveying device configured to convey a sheet along a conveying path;

a printing device configured to form an image on the sheet by ejecting ink onto the sheet conveyed along the conveying path;

a drying device arranged on a downstream side of the printing device in a sheet conveying direction, including a heater configured to heat the sheet, and dry the ink on the sheet; and an edge detection portion arranged on an upstream side of the printing device in the sheet conveying direction and configured to detect a pair of lateral edge positions that are positions of both ends of the sheet in a width direction crossing the sheet conveying direction;

the image forming control method comprising:

a processor, when an operation mode is a first mode, causing the sheet conveying device to execute a process of conveying a target sheet in a state where a first surface of the target sheet serves as a printing surface;

the processor acquiring a pair of first lateral edge positions that are detection results of the edge detection portion when the target sheet is conveyed with the first surface of the target sheet serving as the printing surface;

the processor causing the printing device to execute a process of forming a first test image on the first surface of the target sheet, the first test image including a plurality of first scale images arranged at a first interval in the width direction with reference to a center position of the pair of first lateral edge positions;

the processor causing the sheet conveying device to execute a process of conveying the target sheet with a second surface of the target sheet serving as the printing surface;

the processor acquiring a pair of second lateral edge positions that are detection results of the edge detection portion when the target sheet is conveyed with the second surface of the target sheet serving as the printing surface;

the processor causing the printing device to execute a process of forming a second test image on the second surface of the target sheet, the second test image including a plurality of second scale images arranged at a second interval in the width direction with reference to a center position of the pair of second lateral edge positions;

the processor acquiring matching scale information that specifies one of the plurality of first scale images formed on the target sheet whose position in the width direction matches one of the plurality of second scale images;

the processor deriving a sheet width ratio that is a ratio of an interval between the pair of second lateral edge positions to an interval between the pair of first lateral edge positions;

the processor deriving a correction value by multiplying the sheet width ratio, the first interval, and a coefficient corresponding to the matching scale information and setting a reference center position obtained by correcting a preset center position with the correction value; and the processor, when the operation mode is a second mode, correcting a position of a print target image in the width direction according to a difference between a center position of the pair of lateral edge positions detected by the edge detection portion and the reference center position, and then causing the printing device to execute a process of forming the print target image on the sheet.

2. The image forming control method according to claim 1, wherein the image forming apparatus further comprises a temperature sensor configured to detect a temperature of the drying device; and the processor, when the operation mode is the first mode, causes the sheet conveying device to execute a process of conveying the target sheet on a condition that the temperature detected by the temperature sensor does not exceed a preset allowable temperature.

3. An image forming apparatus comprising:

a sheet conveying device configured to convey a sheet along a conveying path;

a printing device configured to form an image on the sheet by ejecting ink onto the sheet conveyed along the conveying path;

a drying device arranged on a downstream side of the printing device in a sheet conveying direction, including a heater configured to heat the sheet, and dry the ink on the sheet;

an edge detection portion arranged on an upstream side of the printing device in the sheet conveying direction configured to detect a pair of lateral edge positions that are positions of both ends of the sheet in a width direction crossing the sheet conveying direction; and a processor configured to achieve an image forming control method according to claim 1.

4. An image forming control method for controlling an image forming apparatus, the image forming apparatus comprising:

a sheet conveying device configured to convey a sheet along a conveying path;

a printing device configured to form an image on the sheet by ejecting ink onto the sheet conveyed along the conveying path;

a drying device arranged on a downstream side of the printing device in a sheet conveying direction, including a heater configured to heat the sheet, and dry the ink on the sheet; and an edge detection portion arranged on an upstream side of the printing device in the sheet conveying direction and configured to detect a pair of lateral edge positions that are positions of both ends of the sheet in a width direction crossing the sheet conveying direction;

the image forming control method comprising:

a processor, when an operation mode is a first mode, causing the sheet conveying device to execute a process of conveying a target sheet in a state where a first surface of the target sheet serves as a printing surface;

the processor acquiring a pair of first lateral edge positions that are detection results of the edge detection portion when the target sheet is conveyed with the first surface of the target sheet serving as the printing surface;

the processor causing the printing device to execute a process of forming a first test image on the first surface of the target sheet, the first test image including a plurality of first scale images arranged at a first interval in the width direction with reference to a center position of the pair of first lateral edge positions;

the processor causing the sheet conveying device to execute a process of conveying the target sheet with a second surface of the target sheet serving as the printing surface;

the processor acquiring a pair of second lateral edge positions that are detection results of the edge detection portion when the target sheet is conveyed with the second surface of the target sheet serving as the printing surface;

the processor causing the printing device to execute a process of forming a second test image on the second surface of the target sheet, the second test image including a plurality of second scale images arranged at a second interval in the width direction with reference to a center position of the pair of second lateral edge positions;

the processor acquiring matching scale information that specifies one of the plurality of first scale images formed on the target sheet whose position in the width direction matches one of the plurality of second scale images;

the processor setting a reference center position according to the matching scale information and a sheet width ratio that is a ratio of an interval between the pair of second lateral edge positions to an interval between the pair of first lateral edge positions;

the processor, when the operation mode is a second mode, correcting a position of the print target image in the width direction according to a difference between the center position of the pair of lateral edge positions detected by the edge detection portion and the reference center position, and then causing the printing device to execute a process of forming the print target image on the sheet; and the processor executing control to stop power supply to the heater of the drying device when the operation mode is the first mode.

5. The image forming control method according to claim 4, wherein the image forming apparatus further comprises a temperature sensor configured to detect a temperature of the drying device; and the processor, when the operation mode is the first mode, causes the sheet conveying device to execute a process of conveying the target sheet on a condition that the temperature detected by the temperature sensor does not exceed a preset allowable temperature.

6. An image forming apparatus comprising:

a sheet conveying device configured to convey a sheet along a conveying path;

a printing device configured to form an image on the sheet by ejecting ink onto the sheet conveyed along the conveying path;

a drying device arranged on a downstream side of the printing device in a sheet conveying direction, including a heater configured to heat the sheet, and dry the ink on the sheet;

an edge detection portion arranged on an upstream side of the printing device in the sheet conveying direction configured to detect a pair of lateral edge positions that are positions of both ends of the sheet in a width direction crossing the sheet conveying direction; and a processor configured to achieve an image forming control method according to claim 4.

7. An image forming control method for controlling an image forming apparatus, the image forming apparatus comprising:

a sheet conveying device configured to convey a sheet along a conveying path;

a printing device configured to form an image on the sheet by ejecting ink onto the sheet conveyed along the conveying path;

a drying device arranged on a downstream side of the printing device in a sheet conveying direction, including a heater configured to heat the sheet, and dry the ink on the sheet; and an edge detection portion arranged on an upstream side of the printing device in the sheet conveying direction and configured to detect a pair of lateral edge positions that are positions of both ends of the sheet in a width direction crossing the sheet conveying direction;

the image forming control method comprising:

a processor, when an operation mode is a first mode, causing the sheet conveying device to execute a process of conveying a target sheet in a state where a first surface of the target sheet serves as a printing surface;

the processor acquiring a pair of first lateral edge positions that are detection results of the edge detection portion when the target sheet is conveyed with the first surface of the target sheet serving as the printing surface;

the processor causing the printing device to execute a process of forming a first test image on the first surface of the target sheet, the first test image including a plurality of first scale images arranged at a first interval in the width direction with reference to a center position of the pair of first lateral edge positions;

the processor causing the sheet conveying device to execute a process of conveying the target sheet with a second surface of the target sheet serving as the printing surface;

the processor acquiring a pair of second lateral edge positions that are detection results of the edge detection portion when the target sheet is conveyed with the second surface of the target sheet serving as the printing surface;

the processor causing the printing device to execute a process of forming a second test image on the second surface of the target sheet, the second test image including a plurality of second scale images arranged at a second interval in the width direction with reference to a center position of the pair of second lateral edge positions;

the processor acquiring matching scale information that specifies one of the plurality of first scale images formed on the target sheet whose position in the width direction matches one of the plurality of second scale images;

the processor setting a reference center position according to the matching scale information and a sheet width ratio that is a ratio of an interval between the pair of second lateral edge positions to an interval between the pair of first lateral edge positions;

the processor, when the operation mode is a second mode, correcting a position of the print target image in the width direction according to a difference between the center position of the pair of lateral edge positions detected by the edge detection portion and the reference center position, and then causing the printing device to execute a process of forming the print target image on the sheet; and the processor, when the operation mode is the first mode, acquiring thickness information representing a thickness of the target sheet; wherein the processor, when the operation mode is the first mode, causes the sheet conveying device to execute a process of conveying the target sheet on the condition that the thickness information satisfies a preset allowable condition.

8. The image forming control method according to claim 7, wherein the image forming apparatus further comprises a temperature sensor configured to detect a temperature of the drying device; and the processor, when the operation mode is the first mode, causes the sheet conveying device to execute a process of conveying the target sheet on the condition that the temperature detected by the temperature sensor does not exceed a preset allowable temperature.

9. An image forming apparatus comprising:

a sheet conveying device configured to convey a sheet along a conveying path;

a printing device configured to form an image on the sheet by ejecting ink onto the sheet conveyed along the conveying path;

a drying device arranged on a downstream side of the printing device in a sheet conveying direction, including a heater configured to heat the sheet, and dry the ink on the sheet;

an edge detection portion arranged on an upstream side of the printing device in the sheet conveying direction configured to detect a pair of lateral edge positions that are positions of both ends of the sheet in a width direction crossing the sheet conveying direction; and a processor configured to achieve an image forming control method according to claim 7.

* * * * *